(12) United States Patent
Takeda

(10) Patent No.: US 6,722,220 B2
(45) Date of Patent: Apr. 20, 2004

(54) OVERRIDE CONTROL FOR A BICYCLE TRANSMISSION

(75) Inventor: Kazuhiro Takeda, Sakai (JP)

(73) Assignee: Shimano, Inc., Sakai (JP)

( * ) Notice: Subject to any disclaimer, the term of this patent is extended or adjusted under 35 U.S.C. 154(b) by 34 days.

(21) Appl. No.: 10/251,437

(22) Filed: Sep. 19, 2002

(65) Prior Publication Data

US 2003/0060325 A1 Mar. 27, 2003

(30) Foreign Application Priority Data

Sep. 21, 2001 (JP) .......................................... 2001-287990

(51) Int. Cl.[7] .............................................. F16H 59/00
(52) U.S. Cl. .............................. 74/335; 474/78; 474/70; 74/336 R
(58) Field of Search ................. 474/70, 78; 74/335, 74/336 R; 701/51, 56

(56) References Cited

U.S. PATENT DOCUMENTS

| 5,213,548 | A | * | 5/1993 | Colbert et al. ................. 474/71 |
| 5,261,858 | A | * | 11/1993 | Browning ..................... 474/69 |
| 5,357,177 | A | * | 10/1994 | Fey et al. ........................ 318/3 |
| 5,551,315 | A | * | 9/1996 | Pikoulas ..................... 74/502.2 |
| 5,728,017 | A | * | 3/1998 | Bellio et al. .................. 474/70 |
| 6,047,230 | A | * | 4/2000 | Spencer et al. ................ 701/57 |

* cited by examiner

Primary Examiner—Dirk Wright
(74) Attorney, Agent, or Firm—James A. Deland

(57) ABSTRACT

A shift control device is provided for a bicycle that uses shift control signals from a signal provider to operate an automatic shifting mechanism of a bicycle transmission, wherein the shift control signals correspond to a traveling condition. The shift control device comprises an override shift command unit for providing an override shift command, and a simulation unit operatively coupled to the override shift command unit for providing simulated shift control signals in response to the override shift command.

21 Claims, 3 Drawing Sheets

OVERRIDE CONTROL FOR A BICYCLE TRANSMISSION

BACKGROUND OF THE INVENTION

The present invention is directed to bicycles and, more particularly, to various features of an electrically controlled bicycle transmission.

Bicycle transmissions usually comprise either internally mounted transmissions or externally mounted transmissions. Internally mounted transmissions usually are built into the hub of the rear wheel, and externally mounted transmissions usually have a derailleur for switching a chain among a plurality of sprockets. A shift control device mounted to the bicycle frame and connected to the transmission by a shift control cable usually controls both types of transmissions.

Recently, automatic shift control devices have been developed to operate the bicycle transmission. Such automatic shift control devices usually operate the bicycle transmission to select a high gear to accommodate high speed traveling and to select a low gear to accommodate low speed travel. The automatic shift control device usually has an electric motor for operating the shift control cable, a control part containing a microprocessor or the like that controls the electric motor, and a wheel speed sensor that outputs wheel speed signals. The wheel speed sensor typically includes a frame-mounted sensor that detects the passage of a magnet attached to the bicycle wheel, and the microprocessor outputs control signals for controlling the motor to switch gears in response to the wheel speed signals.

It is sometimes desirable to change gears manually in an automatic shift control device, and sometimes a manual switch or the like is operatively coupled to the microprocessor for that purpose. The manual switch typically generates an interrupt signal to the microprocessor, and the microprocessor executes different program routines to accomplish the manual gear change. Of course, this requires a separate port in the microprocessor and appropriate programming to accommodate automatic and manual modes of operation, which increases the complexity of the device. Furthermore, it may not be possible to add a manual gear changing mode at all to an apparatus that has been provided with only an automatic gear changing mode, and with a conventional system it may be necessary to make large changes to the hardware configuration and the control program of the microprocessor, thus making manual gear changing operations impracticable.

SUMMARY OF THE INVENTION

The present invention is directed to various features of an electrically controlled bicycle transmission. In one inventive feature, a shift control device is provided for a bicycle that uses shift control signals from a signal provider to operate an automatic shifting mechanism of a bicycle transmission, wherein the shift control signals correspond to a traveling condition. The shift control device comprises an override shift command unit for providing an override shift command, and a simulation unit operatively coupled to the override shift command unit for providing simulated shift control signals in response to the override shift command.

In another inventive feature, a shift control device is provided for operating an automatic shifting mechanism of a bicycle transmission. The shift control device comprises a signal provider that provides shift control signals corresponding to a traveling condition; an override shift command unit for providing an override shift command; a simulation unit operatively coupled to the signal provider and to the override shift command unit for providing simulated shift control signals in response to the override shift command; and a gear change unit that outputs signals for operating the bicycle transmission in response to the shift control signals and the simulated shift control signals. Additional inventive features will become apparent from the description below, and such features may be combined with the above features to provide additional benefits.

DETAILED DESCRIPTION OF THE EMBODIMENTS

Figure 1:
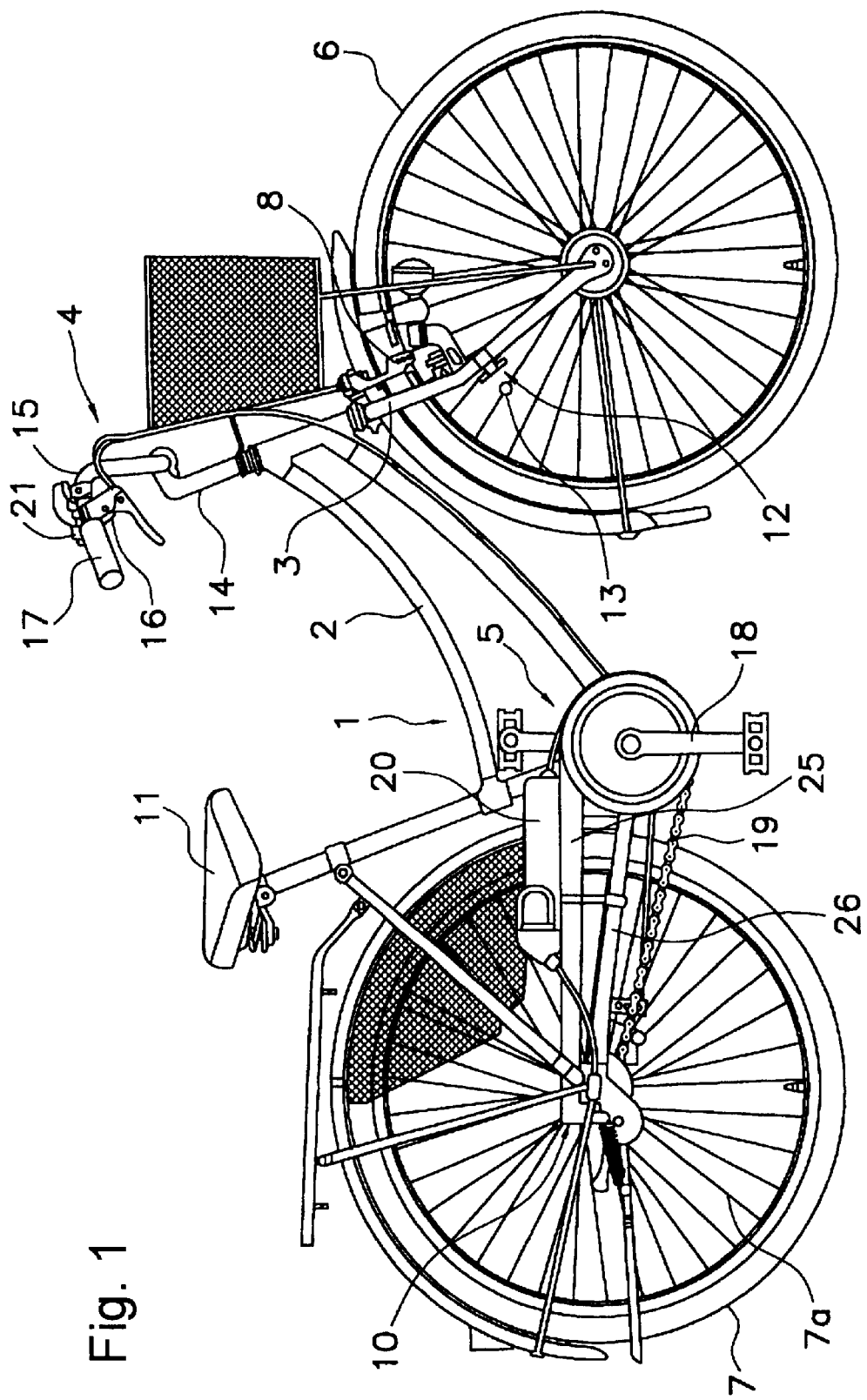
FIG. 1 is a side view of a bicycle that includes a particular embodiment of a shift control device.
Figure 2:
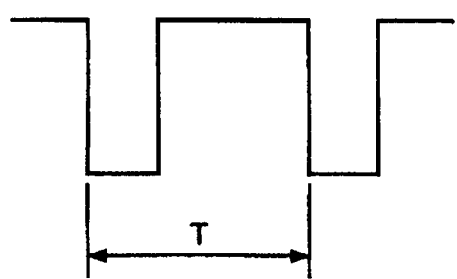
FIG. 2 is an example of a wheel speed signal.

FIG. 1 is a side view of a bicycle that includes a particular embodiment of a shift control device. The bicycle comprises a frame 1 having a double-loop-shaped frame body 2, a saddle 11, a front fork 3, a handlebar part 4, a driving part 5, a front wheel 6, a rear wheel 7 in which is installed a 3-speed internal gear changing hub 10, and front and rear brake devices 8 (only the front brake device is shown in the drawing). The handlebar part 4 has a handlebar stem 14, which is fixed to an upper part of the front fork 3, and a handlebar 15 fixed to the handlebar stem 14. Brake levers 16 and grips 17 are installed on the two ends of the handlebar 15. Brake levers 16 operate the brake devices 8. A signal provider such as a wheel speed sensor 12 comprising a reed switch is installed on the front fork 3. The wheel speed sensor 12 detects the passage of a magnet 13 installed on the front wheel 6 and outputs pulse-shaped wheel speed signals as shown in FIG. 2.

Figure 3:
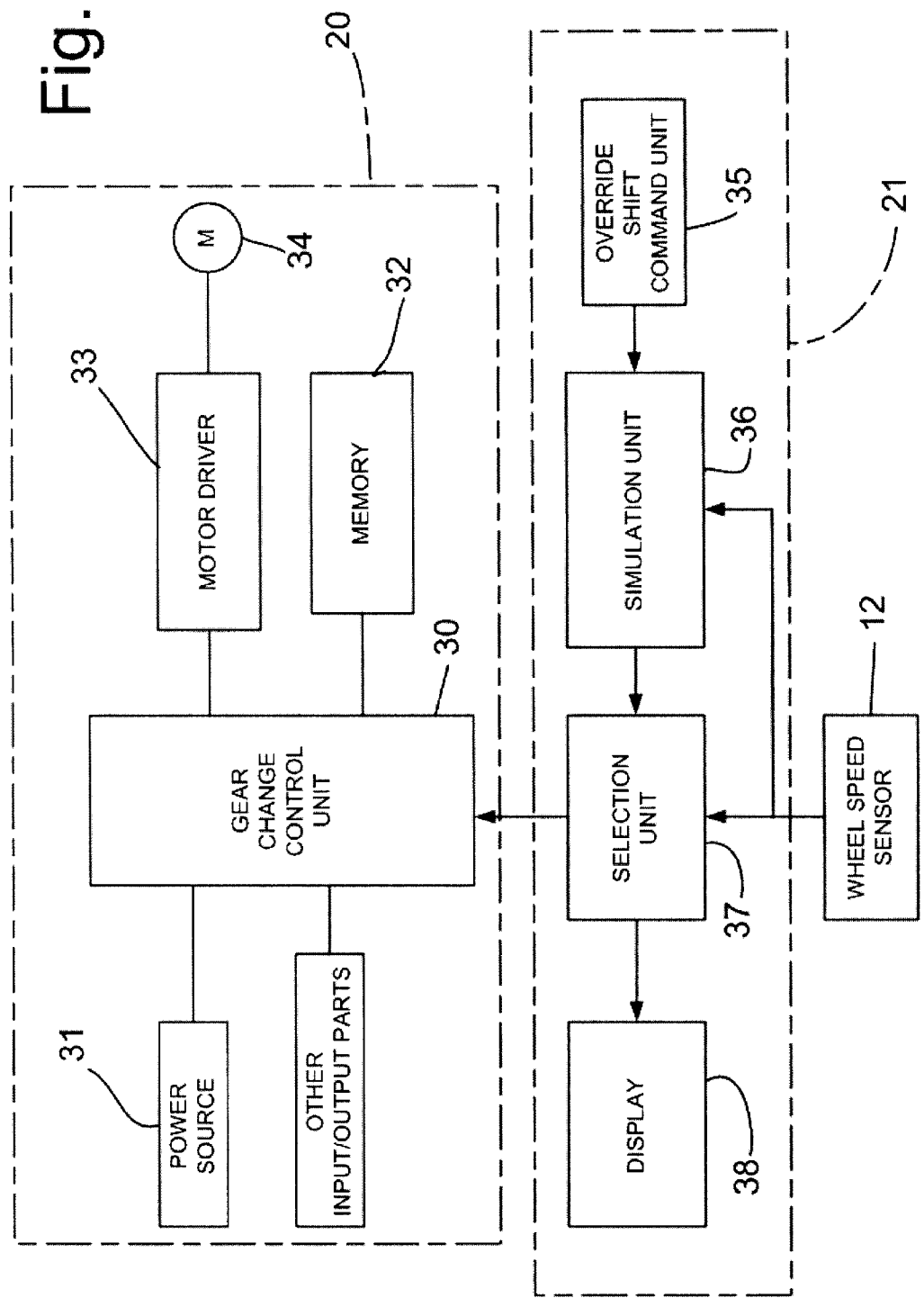
FIG. 3 is a block diagram of a control system associated with the shift control device.

An automatic gear change unit 20 is mounted to a chain case 25 and a chain stay 26, and a manual gear change control unit 21 for carrying out manual gear change control is mounted to handlebar 15. As shown in FIG. 3, automatic gear change unit 20 includes a gear change control unit 30 containing a microprocessor comprising a CPU, a RAM, a ROM and an I/O interface; a power source 31; a memory 32; a motor driver 33; a motor 34 connected to the motor driver 33; and other input/output parts. A gear change operation of the internal gear changing hub 10 is carried out using the motor 34.

In this embodiment, the wheel speed signals are used by gear change control unit 30 to change gears in hub 10. More specifically, the gear change control unit 30 receives pulse-shaped wheel speed signals as shown in FIG. 2, measures the period T thereof, and outputs gear change control signals with a pattern as follows (when upshifting):

$0 \leq T \leq t1$: Low gear
$t1 \leq T \leq t2$: Medium gear
$t2 \leq T$: High gear To prevent chattering during gear changing, hysteresis is provided in a known manner by making the shift points when downshifting different from the shift points when upshifting.

Figure 4:
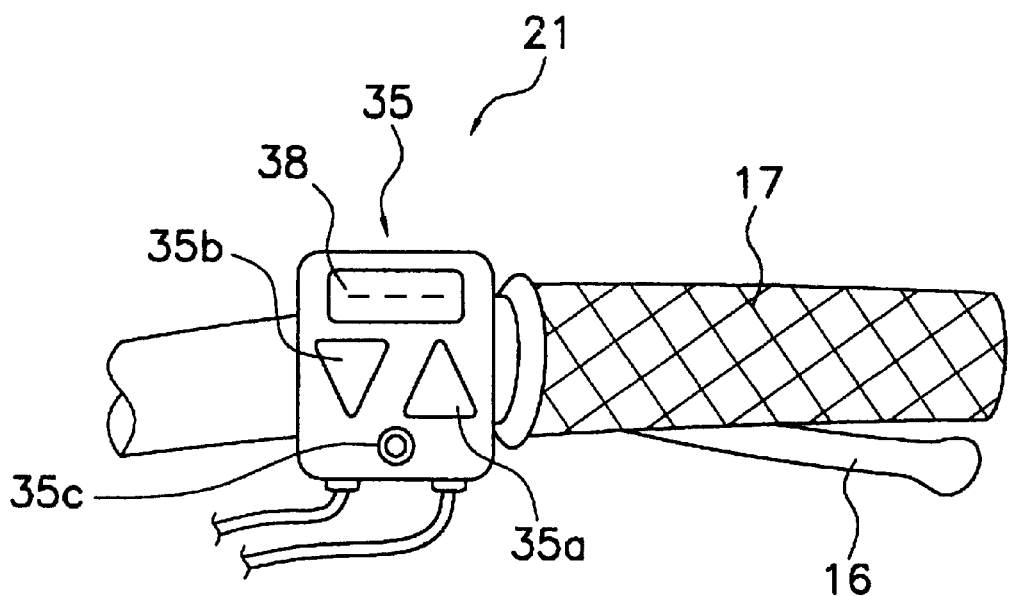
FIG. 4 is a perspective view of a portion of a handlebar that includes a manually operated gear change control unit.

As shown in FIG. 4, the manual gear change control unit 21 is installed on the inside of the right handgrip 17. The manual gear change control unit 21 comprises a manually operated override shift command unit 35 for providing override shift commands, a simulation unit 36 for providing simulated shift control signals in response to the override shift commands from override shift command unit 35, a selection unit 37 that receives wheel speed signals from the wheel speed sensor 12 and simulated shift control signals from override shift command unit 35 and selectively outputs these signals, and a display 38 that displays the gear to be selected in accordance with the signal selected by the selection unit 37.

The override shift command unit 35 has a manually operated upshift command member such as an upshift command button 35a, a manually operated downshift command member such as a downshift command button 35b, and a manually operated cancel command member such as a cancel command button 35c. The upshift command button 35a and the downshift command button 35b cause gear change control unit 30 to change gears in hub 10 by one level higher or lower than the currently selected gear, respectively, each time they are pressed. Cancel command button 35c cancels manual gear change control so that the bicycle transmission returns to automatic gear change control.

During automatic operation, wheel speed signals from wheel speed sensor 12 are provided to the selection unit 37, and selection unit 37 communicates these signals to the gear change control unit 30 of the automatic gear change unit 20 without modification. Moreover, the current gear corresponding to the wheel speed signals is indicated on the display 38. The gear change control unit 30 receives the wheel speed signals and outputs gear change control signals to motor driver 33 for carrying out upshift control (in accordance with the pattern shown in FIG. 2) or downshift control (in accordance with a pattern similar to the pattern shown in FIG. 2). As a result, the motor 34 is driven, and automatic gear change control of the internal gear changing hub 10 is carried out.

If the rider wishes to change gears during traveling (i.e., to override the automatically selected gear), then the rider presses the upshift command button 35a or the downshift command button 35b of the override shift command unit 35 of the manual gear change control unit 21 to change to the gear one level higher or lower than the current gear. More specifically, the signal from the upshift command button 35a or the downshift command button 35b is input to the simulation unit 36, together with the wheel speed signals from wheel speed sensor 12. The wheel speed signals function as a current gear input to simulation unit 36, since simulation unit 36 can calculate the current gear from the signal periods. Simulation unit 36 then outputs simulated wheel speed signals having periods that correspond to the selected gear, and selection unit 37 communicates these signals to automatic gear change unit 20.

For example, if the current gear is the medium gear and the upshift command button 35a is pressed by the rider, the simulation unit 36 generates a simulated shift control signal in the form of simulated wheel speed signals having periods corresponding to the high gear. The selection unit 37 then receives the wheel speed signals from the wheel speed sensor 12 and the simulated wheel speed signals corresponding to the high gear from the simulation unit 36, gives precedence to and selects the simulated wheel speed signals, and outputs the simulated wheel speed signals to the gear change control unit 30. The same operation occurs when the rider presses downshift button 35b. Once a manual operation has been carried out, the simulated wheel speed signals last generated are continually generated by simulation unit 36 with a prescribed period until another manual operation is carried out, and the selection unit 37 continually outputs the simulated wheel speed signals to maintain the selected gear.

If the rider wishes to shift from the manual mode of operation back to the automatic mode of operation, the rider presses the cancel command button 35c. At that time, simulation unit 36 stops providing the simulated wheel speed signals, and the selection unit 37 outputs the wheel speed signals from the wheel speed sensor 12 to the gear change control unit 30. From here, automatic gear change control is carried out until one of the buttons for manual operation is again pressed.

In any event, in this embodiment, automatic gear change unit 20 operates on the signal from selection unit 37 in the same way as in the case of automatic gear changing described above. It does not know whether the input signal is an original wheel speed signal from wheel speed sensor 12 or a simulated wheel speed signal from simulation unit 36. Thus, control processing can be carried out on these signals using exactly the same control program found in an automatic gear change unit 20 of the prior art, and the programming of the gear change control unit 30 can be made very simple. Moreover, manual gear change control can be added to a conventional apparatus that provides only automatic gear change control simply by providing the manual gear change control unit between the automatic gear change unit and the wheel speed sensor, with virtually no changes being made to the hardware configuration.

While the above is a description of various embodiments of inventive features, further modifications may be employed without departing from the spirit and scope of the present invention. In the embodiment described above, the signals from the wheel speed sensor 12 or simulation unit 36 were selectively communicated to a single port in gear change control unit 30. However, it is also possible to communicate these signals to gear change control unit 30 separately, and gear change control unit 30 could carry out the selection of the signals. In this case, for a conventional apparatus for which only automatic gear change control is possible, it is necessary to change the hardware configuration and the program of the gear change control unit 30, but then the selection unit 37 in the manual gear change control unit 21 becomes unnecessary.

In the embodiment described above, an upshift command button 35a and a downshift command button 35b were provided on the override shift command unit 35, and the current gear was manually changed one level at a time. However, multiple gear changes could be accommodated by various button configurations. For example, in the case of 3-level gear changing, it is possible to provide a low gear button, a medium gear button and a high gear button in override shift command unit 35, with simulated shift control signals being generated accordingly by pressing the appropriate button.

In the embodiment described above, the wheel speed was given as an example of a traveling condition. However, it is also possible to use other signals such as the torque acting on the crankshaft and so on as the traveling condition. In this case, simulated torque signals would be generated instead of simulated wheel speed signals.

The size, shape, location or orientation of the various components may be changed as desired. Components that are shown directly connected or contacting each other may have intermediate structures disposed between them. The functions of one element may be performed by two, and vice versa. The structures and functions of one embodiment may be adopted in another embodiment. It is not necessary for all advantages to be present in a particular embodiment at the same time. Every feature that is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus on a particular structure or feature.

What is claimed is:

1. A shift control device for a bicycle that uses shift control signals from a signal provider to operate an automatic gear change unit of a bicycle transmission, wherein the shift control signals correspond to a traveling condition, the shift control device comprising:

an override shift command unit for providing an override shift command; and a simulation unit operatively coupled to the override shift command unit for providing simulated shift control signals in response to the override shift command.

2. The device according to claim 1 wherein the simulation unit comprises a current gear input for receiving information indicating a currently selected gear of the bicycle transmission, and wherein the simulation unit provides simulated shift control signals based on the currently selected gear of the bicycle transmission.

3. The device according to claim 2 wherein the simulation unit provides simulated shift control signals to change the currently selected gear of the bicycle transmission by one step in response to the shift command.

4. The device according to claim 1 wherein the override shift command unit includes:

a manually operated upshift command member; and a manually operated downshift command member.

5. The device according to claim 4 wherein the upshift command member comprises an upshift command button, and wherein the downshift command member comprises a downshift command button.

6. The device according to claim 1 further comprising a selection unit that receives the shift control signals and the simulated shift control signals and outputs one of the shift control signals and the simulated shift control signals.

7. The device according to claim 6 wherein the selection unit outputs the simulated shift control signals in priority over the shift control signals.

8. The device according to claim 7 wherein, when the simulation unit receives the override shift command, the selection unit always outputs the simulated shift control signals in priority over the shift control signals.

9. The device according to claim 8 wherein the override shift command unit includes a cancel command unit for providing a cancel command to the simulation unit, wherein the simulation unit outputs the shift control signals in priority over the simulated shift control signals in response to the cancel command.

10. The device according to claim 9 wherein the override shift command unit includes:

a manually operated upshift command member;

a manually operated downshift command member; and a manually operated cancel command member.

11. A shift control device for operating an automatic gear change unit of a bicycle transmission, wherein the shift control device comprises:

a signal provider that provides shift control signals corresponding to a traveling condition;

an override shift command unit for providing an override shift command;

a simulation unit operatively coupled to the signal provider and to the override shift command unit for providing simulated shift control signals in response to the shift control signals and the override shift command; and a gear change unit that outputs signals for operating the bicycle transmission in response to the shift control signals and the simulated shift control signals.

12. The device according to claim 11 wherein the signal provider comprises a wheel speed sensor.

13. The device according to claim 11 further comprising a selection unit that receives the shift control signals and the simulated shift control signals and outputs one of the shift control signals and the simulated shift control signals to the gear change unit.

14. The device according to claim 13 wherein the selection unit outputs the simulated shift control signals in priority over the shift control signals.

15. The device according to claim 14 wherein the simulation unit comprises a current gear input for receiving information indicating a currently selected gear of the bicycle transmission, and wherein the simulation unit outputs simulated shift control signals based on the currently selected gear of the bicycle transmission.

16. The device according to claim 15 wherein the gear change unit outputs signals for operating the bicycle transmission by one speed step for each operation thereof.

17. The device according to claim 16 wherein the simulation unit outputs simulated shift control signals to change the currently selected gear of the bicycle transmission by one step in response to the override shift command.

18. The device according to claim 15 wherein the signal provider comprises a wheel speed sensor that provides wheel speed signals, wherein the simulation unit outputs simulated wheel speed signals.

19. The device according to claim 18 wherein, when the simulation unit receives an override shift command, the selection unit always outputs the simulated shift control signals in priority over the shift control signals.

20. The device according to claim 19 wherein the override shift command unit includes a cancel command unit for providing a cancel command to the simulation unit, wherein the simulation unit outputs the shift control signals in priority over the simulated shift control signals in response to the cancel command.

21. The device according to claim 20 wherein the override shift command unit includes:

a manually operated upshift command member;

a manually operated downshift command member; and a manually operated cancel command member.

* * * * *